US011875956B2

(12) United States Patent
Seo

(10) Patent No.: US 11,875,956 B2
(45) Date of Patent: Jan. 16, 2024

(54) CONTACT POINT MONITORING DEVICE FOR VACUUM CIRCUIT BREAKER, AND VACUUM CIRCUIT BREAKER COMPRISING SAME

(71) Applicant: LS ELECTRIC CO., LTD., Anyang-si (KR)

(72) Inventor: Min-Kyu Seo, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 181 days.

(21) Appl. No.: 17/431,779

(22) PCT Filed: Sep. 10, 2019

(86) PCT No.: PCT/KR2019/011719
§ 371 (c)(1),
(2) Date: Aug. 18, 2021

(87) PCT Pub. No.: WO2020/171328
PCT Pub. Date: Aug. 27, 2020

(65) Prior Publication Data

US 2022/0115197 A1 Apr. 14, 2022

(30) Foreign Application Priority Data

Feb. 18, 2019 (KR) ........................ 10-2019-0018651
Feb. 18, 2019 (KR) ........................ 10-2019-0018681

(51) Int. Cl.
*H01H 33/662* (2006.01)
*H01H 33/664* (2006.01)
*H01H 33/666* (2006.01)

(52) U.S. Cl.
CPC ...... *H01H 33/6661* (2013.01); *H01H 33/662* (2013.01); *H01H 33/664* (2013.01)

(58) Field of Classification Search
CPC ............. H01H 33/6661; H01H 33/662; H01H 33/664; H01H 1/0015; H01H 11/0062; H01H 2071/044; G01B 11/00; G01D 5/30
(Continued)

(56) References Cited

U.S. PATENT DOCUMENTS 3,925,722 A * 12/1975 Fohrhaltz ............. G01R 27/205
324/415
6,002,560 A * 12/1999 Nguyen ............... H01H 1/0015
361/115

(Continued)

FOREIGN PATENT DOCUMENTS

JP 59025146 U 2/1984
JP H06215669 A 8/1994

(Continued)

OTHER PUBLICATIONS

Translation of JP06215669 (Original document published Aug. 5, 1994) (Year: 1994).*

(Continued)

*Primary Examiner* — William A Bolton
(74) *Attorney, Agent, or Firm* — K&L Gates LLP

(57) ABSTRACT

The present disclosure provides a contact point monitoring device for a vacuum circuit breaker comprising: a fixed electrode which is fixed in an insulated container; a fixed contact point which is disposed at one end of the fixed electrode; a movable electrode which is installed in the insulated container and is movable in the upward or downward direction; a vacuum interrupter which is disposed at one end of the movable electrode and includes a movable contact point coming into contact with or separated from the fixed contact point; and a pushrod assembly which is coupled to the other end of the movable electrode and allows the movable electrode to move upwards or downwards.

22 Claims, 6 Drawing Sheets

(58) Field of Classification Search
USPC ............... 218/2, 7, 10, 19, 134; 250/231.13, 250/231.18
See application file for complete search history.

(56) References Cited

U.S. PATENT DOCUMENTS

| | | | | |
|---|---|---|---|---|
| 6,150,625 A * | 11/2000 | Marchand | H01H 1/0015 218/118 |
| 7,098,418 B1 * | 8/2006 | Yamada | H01H 1/0015 218/120 |
| 7,952,065 B2 | 5/2011 | Hama | |
| 8,952,826 B2 * | 2/2015 | Leccia | H01H 33/6662 218/123 |
| 9,218,923 B2 * | 12/2015 | Johansson | H01H 73/12 |
| 9,378,901 B2 * | 6/2016 | Ashtekar | H01H 33/666 |
| 9,633,808 B2 * | 4/2017 | Ricciuti | H01H 1/0015 |
| 9,691,574 B2 * | 6/2017 | Gerovac | H01H 33/66207 |
| 10,147,572 B2 * | 12/2018 | Huo | H01H 33/6606 |
| 2013/0314387 A1 | 11/2013 | Kwack et al. | |
| 2018/0254159 A1 | 9/2018 | Shi et al. | |

FOREIGN PATENT DOCUMENTS

| | | | |
|---|---|---|---|
| JP | H10274506 | A | 10/1998 |
| JP | H1187937 | A | 3/1999 |
| JP | 2005308706 | A | 11/2005 |
| JP | 2006310133 | A | 11/2006 |
| JP | 2007149369 | A | 6/2007 |
| JP | 4685609 | A | 2/2011 |
| JP | 4876233 | B2 | 12/2011 |
| JP | 2012150000 | A | 8/2012 |
| KR | 101279061 | B1 | 7/2013 |
| KR | 101323310 | B1 | 10/2013 |
| KR | 101860348 | B1 | 5/2018 |
| WO | 2004057633 | A1 | 7/2004 |
| WO | 2018077943 | A1 | 5/2018 |

OTHER PUBLICATIONS

Extended European Search Report for related European Application No. 19915986.4; dated Mar. 25, 2022; ( 7 pages).
International Search Report for related International Application No. PCT/KR2019/011719; dated Aug. 27, 2020; (5 pages).
Written Opinion for related International Application No. PCT/KR2019/011719; dated Aug. 27, 2020; (6 pages).
Japanese Office Action for related Japanese Application No. 2021-547782; dated Sep. 6, 2022; (5 pages).

* cited by examiner

CONTACT POINT MONITORING DEVICE FOR VACUUM CIRCUIT BREAKER, AND VACUUM CIRCUIT BREAKER COMPRISING SAME

CROSS-REFERENCE TO RELATED APPLICATIONS

This application is the National Stage filing under 35 U.S.C. 371 of International Application No. PCT/KR2019/011719, filed on Sep. 10, 2019, which claims the benefit of earlier filing date and right of priority to Korea utility model Application No. 10-2019-0018651 filed on Feb. 18, 2019, and Korea utility model Application No. 10-2019-0018681 filed on Feb. 18, 2019, the contents of which are all hereby incorporated by reference herein in their entirety.

FIELD

The present disclosure relates to a contact monitoring device for a vacuum circuit breaker and a vacuum circuit breaker including the same.

BACKGROUND

A vacuum circuit breaker is an electrical protector that uses dielectric strength of vacuum to protect load devices and lines from fault currents in an event of short circuits or ground faults occurring in electrical circuits.

The vacuum circuit breaker performs power transport control and power system protection. The vacuum circuit breaker has a large breaking capacity and high reliability and safety. Since the vacuum circuit breaker may be mounted in a small installation space, the breaker may be easily applied to a voltage range from a medium voltage to high voltage.

The vacuum circuit breaker includes a vacuum interrupter that blocks current, a power transmission device that transmits power to the vacuum interrupter, and a push rod that performing vertical reciprocating motion under power from the power transmission device to insert or withdraw a contact in the vacuum interrupter. In an example, Korean patent No. 10-1860348 (issue date May 16, 2018) discloses a vacuum interrupter of a vacuum circuit breaker.

A conventional vacuum interrupter includes an insulating container, a fixed electrode, a movable electrode, and an arc shield. The fixed electrode has a fixed contact, and the movable electrode has a movable contact 170. Further, according to a vertical movement of the movable electrode, the movable contact contacts or is separated from the fixed contact.

However, when a current blocking operation of the vacuum interrupter is repeated, the fixed contact or the movable contact (hereinafter, collectively referred to as "contact") is gradually worn. In addition, when the contact is worn by an amount greater than a threshold amount, this causes short-time performance, short-circuit performance, and conductance performance of the vacuum interrupter to deteriorate. Accordingly, in order to repair or replace the contact worn by the amount greater than the threshold amount, it is necessary to detect a wear state of the contact.

SUMMARY

A purpose of the present disclosure is to provide a contact monitoring device for a vacuum circuit breaker capable of monitoring a contact wear amount inside a vacuum interrupter, and provide a vacuum circuit breaker including the same.

Further, a purpose of the present disclosure is to provide a contact monitoring device for a vacuum circuit breaker in which the contact monitoring device includes a photosensor having a horizontal sensing direction and capable of detecting a contact wear amount corresponding to a vertical displacement, and provide a vacuum circuit breaker including the same.

Purposes of the present disclosure are not limited to the above-mentioned purpose. Other purposes and advantages of the present disclosure that are not mentioned above may be understood based on following descriptions, and will be more clearly understood with reference to embodiments of the present disclosure. Further, it will be readily apparent that the purposes and advantages of the present disclosure may be realized using means and combinations thereof indicated in the Claims.

One embodiment of the present disclosure provides a contact monitoring device for a vacuum circuit breaker, wherein the vacuum circuit breaker may include: a vacuum interrupter may include: a fixed electrode fixedly received in an insulating container; a fixed contact disposed at one end of the fixed electrode; a movable electrode installed in the insulating container, wherein the movable electrode is movable downwardly or upwardly; and a movable contact disposed at one end of the movable electrode, wherein the movable contact contacts or is spaced from the fixed contact; and a push rod assembly coupled to the other end of the movable electrode for raising up or lowering the movable electrode, wherein the contact monitoring device may include a sensor assembly installed adjacent to the push rod assembly and having a sensing direction different from a movement direction of the push rod assembly, wherein the contact monitoring device further may include a discriminative sticker attached to an outer circumferential face of a cylindrical rod housing of the push rod assembly, wherein the sensor assembly monitors a position of the discriminative sticker.

The sensing direction of the sensor assembly may be perpendicular to the movement direction of the push rod assembly.

The discriminative sticker may have a first area and a second area arranged in the movement direction of the push rod assembly, wherein the first area and the second area have different reflectance.

The discriminative sticker may have a plurality of areas arranged in the movement direction of the push rod assembly, wherein the plurality of areas have reflectance varying in a stepwise manner.

The discriminative sticker may have a gray level continuously gradually varying in the movement direction of the push rod assembly, and thus may have reflectance continuously gradually varying in the movement direction of the push rod assembly.

The sensor assembly may include a photosensor module for monitoring the position of the discriminative sticker, wherein the photosensor module may include: a light-emitter facing toward the discriminative sticker and emitting light toward the discriminative sticker; a light-receiver facing toward the discriminative sticker and receiving light reflected from the discriminative sticker; and a circuit coupled to the light-emitter and the light-receiver, wherein the circuit outputs an output signal based on an amount of light received by the light-receiver.

The sensor assembly further may include: a sensor holder installed adjacent to the push rod assembly, wherein the holder accommodates therein the photosensor module, wherein the holder may have one open side face facing toward the push rod assembly, wherein the light-emitter and the light-receiver are exposed toward the push rod assembly through the open one side face; and a sensor bracket coupled to one side of a bottom of a main circuit housing to support the sensor holder.

The sensor assembly further may include a determination unit configured to compare the output signal of the circuit with a pre-stored reference value and to determine a contact wear amount of the vacuum interrupter based on the comparing result.

The discriminative sticker may have a black top area, a white bottom area, and a middle area therebetween, wherein the gray level in the middle area gradually increases from the top area to the bottom area, wherein the determination unit may be configured to determine that the contact wear amount reaches a limit value when the contact wear amount based on the output signal output from the circuit is greater than or equal to a pre-stored threshold value, and to output a notification signal.

The discriminative sticker may have a while top area, a black bottom area, and a middle area therebetween, wherein the gray level in the middle area gradually decreases from the top area to the bottom area, wherein the determination unit may be configured to determine that the contact wear amount reaches a limit value when the contact wear amount based on the output signal output from the circuit is smaller than or equal to a pre-stored threshold value, and to output a notification signal.

One embodiment of the present disclosure provides a vacuum circuit breaker comprising: a vacuum interrupter may include: a fixed electrode fixedly received in an insulating container; a fixed contact disposed at one end of the fixed electrode; a movable electrode installed in the insulating container, wherein the movable electrode is movable downwardly or upwardly; and a movable contact disposed at one end of the movable electrode, wherein the movable contact contacts or is spaced from the fixed contact; and a main circuit having a housing accommodating therein the vacuum interrupter; a push rod assembly coupled to the other end of the movable electrode for raising up or lowering the movable electrode; and a sensor assembly installed adjacent to the push rod assembly and having a sensing direction different from a movement direction of the push rod assembly.

The sensing direction of the sensor assembly may be perpendicular to the movement direction of the push rod assembly.

The vacuum circuit breaker further may include a discriminative sticker attached to an outer circumferential face of a cylindrical rod housing of the push rod assembly.

The discriminative sticker may have a first area and a second area arranged in the movement direction of the push rod assembly, wherein the first area and the second area have different reflectance.

The discriminative sticker may have a plurality of areas arranged in the movement direction of the push rod assembly, wherein the plurality of areas have reflectance varying in a stepwise manner.

The discriminative sticker may have a gray level continuously gradually varying in the movement direction of the push rod assembly, and thus may have reflectance continuously gradually varying in the movement direction of the push rod assembly.

The sensor assembly may include a photosensor module for monitoring the position of the discriminative sticker, wherein the photosensor module may include: a light-emitter facing toward the discriminative sticker and emitting light toward the discriminative sticker; a light-receiver facing toward the discriminative sticker and receiving light reflected from the discriminative sticker; and a circuit coupled to the light-emitter and the light-receiver, wherein the circuit outputs an output signal based on an amount of light received by the light-receiver.

Technical Effect

The contact monitoring device for the vacuum circuit breaker according to the present disclosure may monitor the wear amount of the contact in real time using the photosensor to determine an appropriate maintenance timing.

Further, the contact monitoring device for the vacuum circuit breaker according to the present disclosure may use the photosensor to determine the contact wear amount before the contact wear amount exceeds the limit value. Thus, the reliability and performance of the vacuum circuit breaker may be improved.

Further, the contact monitoring device for the vacuum circuit breaker according to the present disclosure may detect the contact wear amount corresponding to the vertical displacement using the photosensor having a horizontal sensing direction. Therefore, the device may accurately detect the contact wear amount to determine the appropriate maintenance timing.

The above-described effects, and specific effects of the present disclosure as not mentioned above will be described based on specific details for carrying out the disclosure.

DETAILED DESCRIPTION

Figure 1:
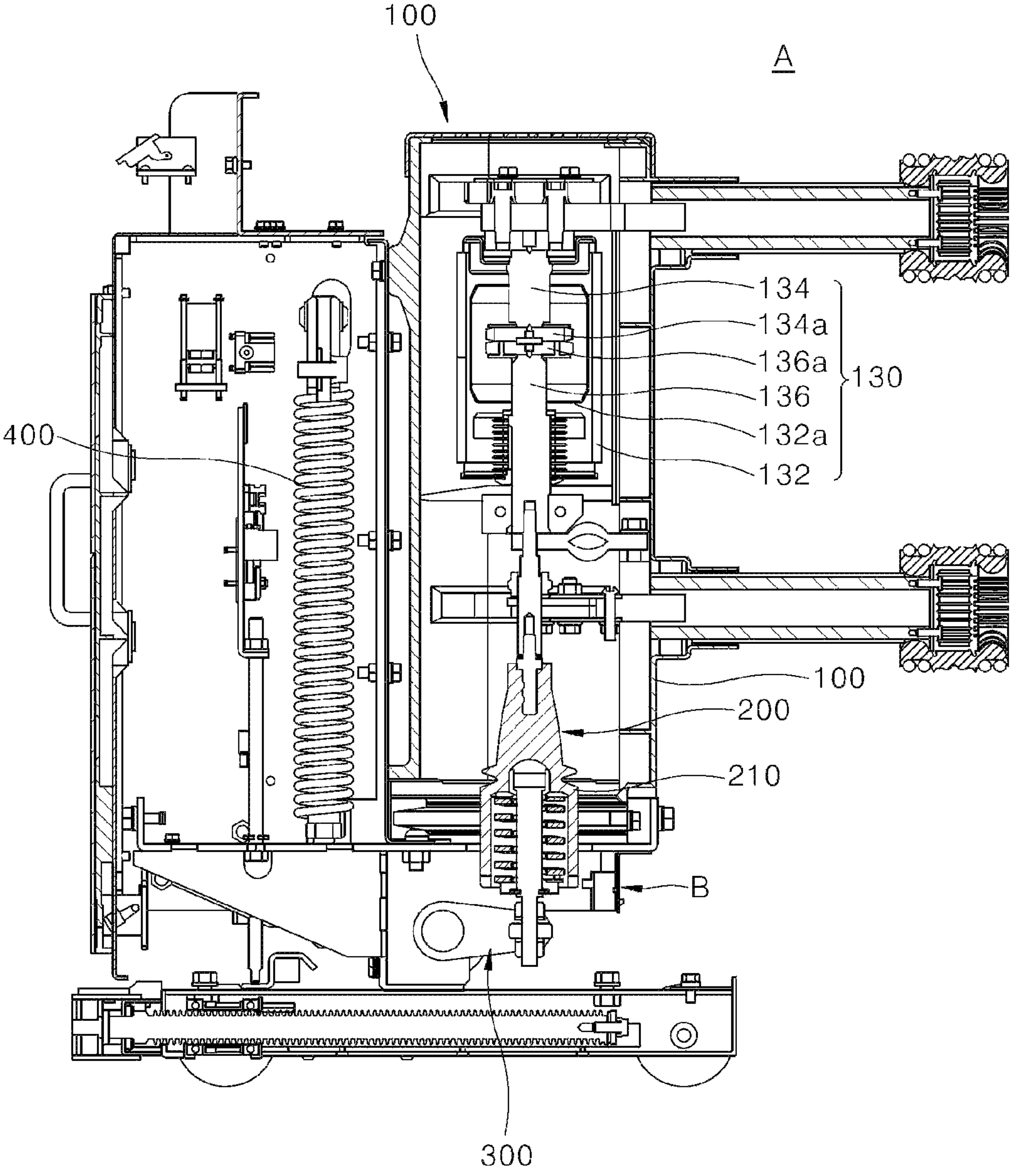
FIG. 1 is a partial cross-sectional view showing a vacuum circuit breaker to which a contact monitoring device according to a first embodiment of the present disclosure is applied.

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted. Hereinafter, a preferred embodiment according to the present disclosure will be described in detail with reference to the accompanying drawings. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Figure 2:
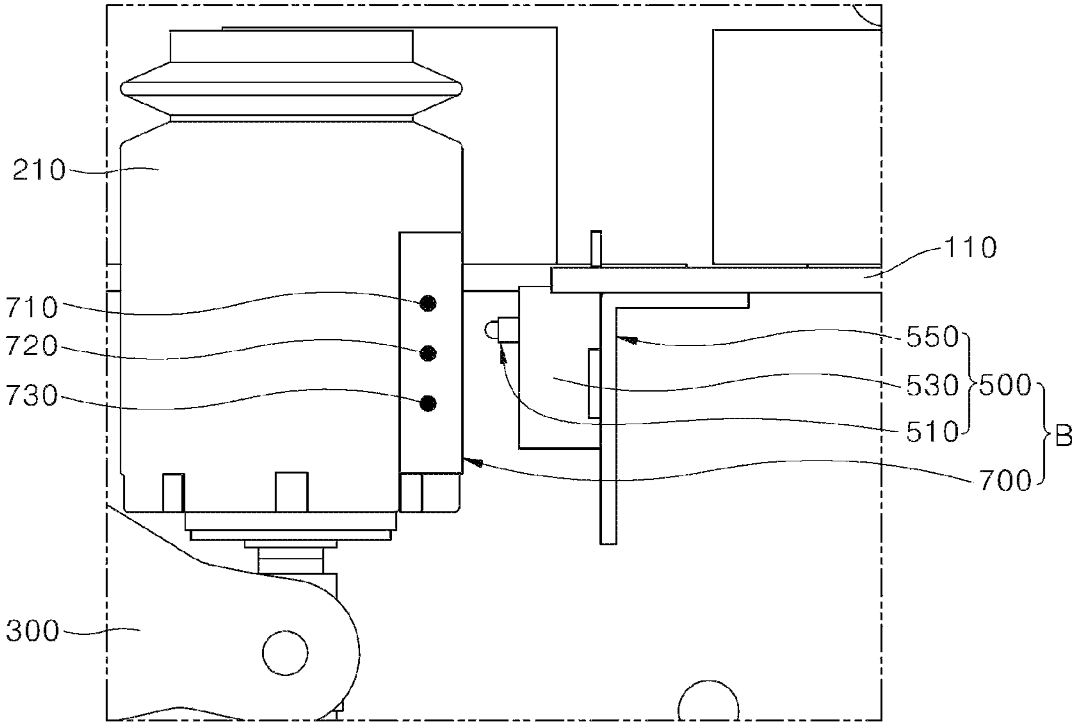
FIG. 2 is a perspective view showing a mounted state of the contact monitoring device according to FIG. 1.
Figure 3:
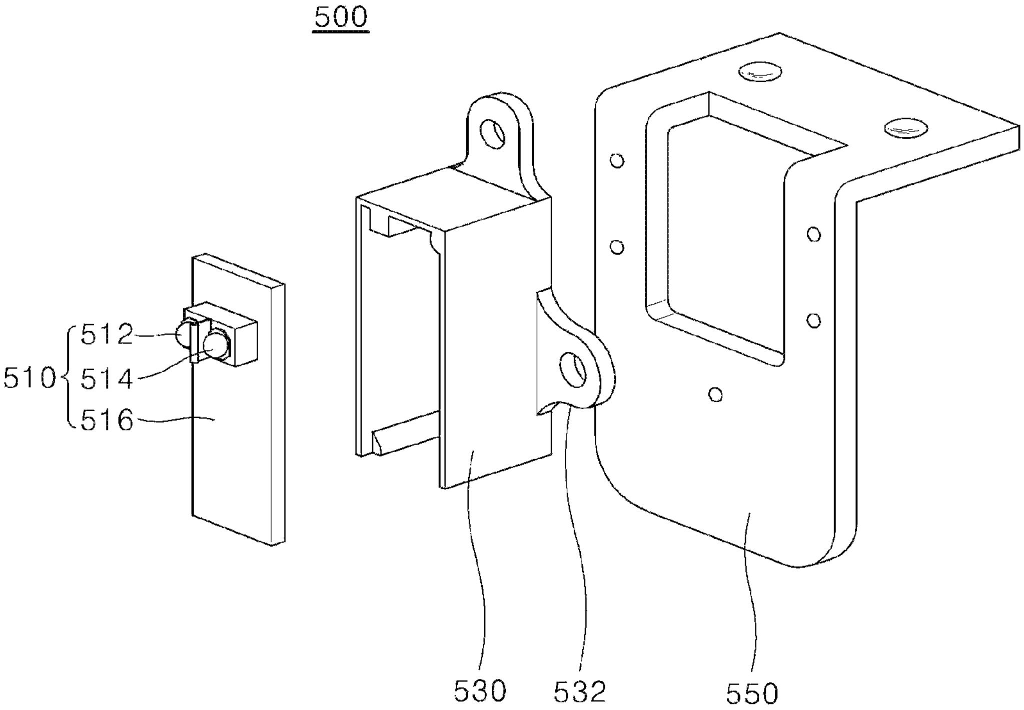
FIG. 3 is an exploded perspective view showing a photosensor of the contact monitoring device according to FIG. 1.
Figure 4:
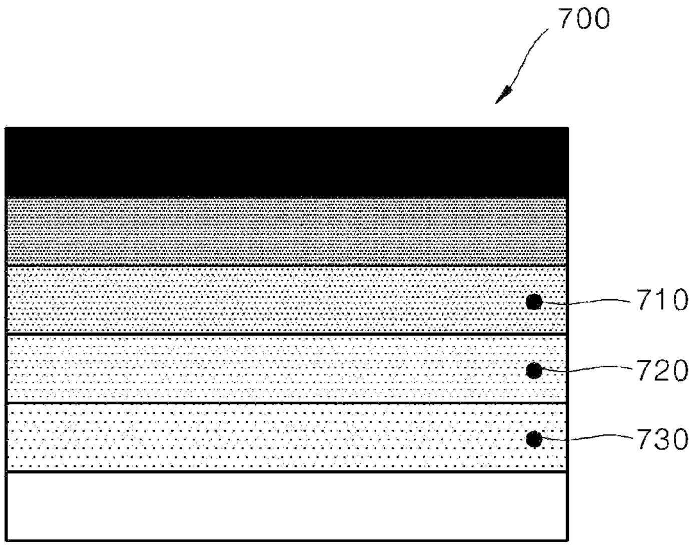
FIG. 4 is a schematic diagram showing a discriminative sticker of the contact monitoring device according to FIG. 1.
Figure 5:
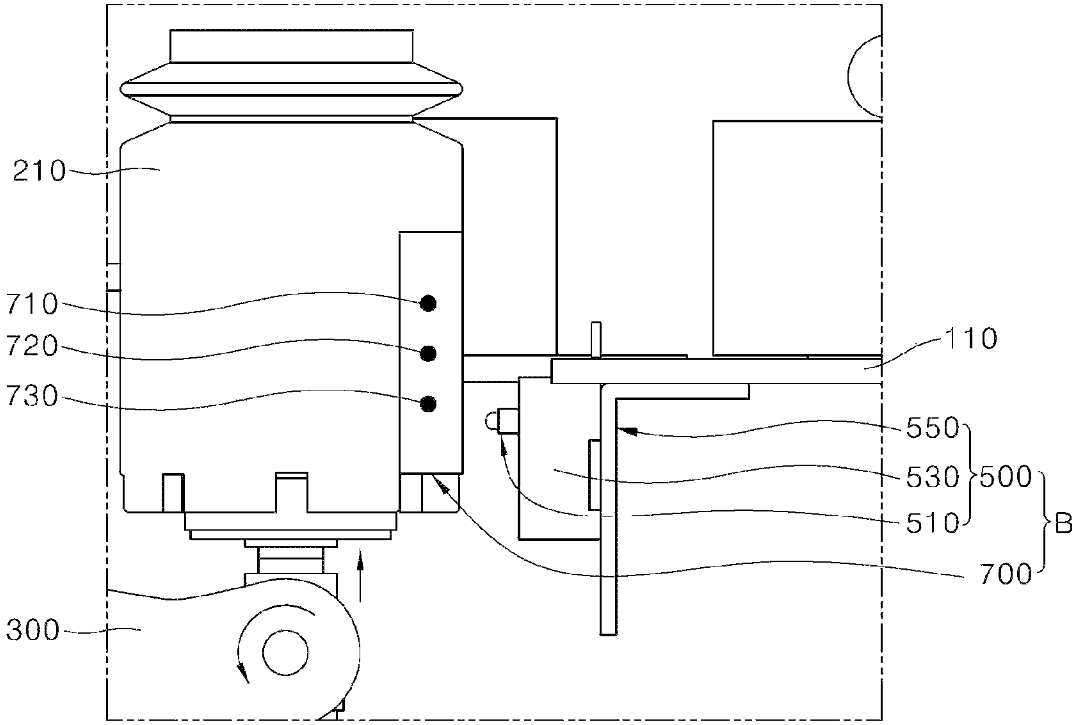
FIG. 5 is a perspective view showing a motion state of the contact monitoring device according to FIG. 1.

FIG. 1 is a partial cross-sectional view showing a vacuum circuit breaker to which a contact monitoring device according to a first embodiment of the present disclosure is applied. FIG. 2 is a perspective view showing a mounted state of the contact monitoring device according to FIG. 1. FIG. 3 is an exploded perspective view showing a photosensor of the contact monitoring device according to FIG. 1. FIG. 4 is a schematic diagram showing a discriminative sticker of the contact monitoring device according to FIG. 1. FIG. 5 is a perspective view showing a motion state of the contact monitoring device according to FIG. 1.

As shown in FIG. 1, a contact monitoring device B for a vacuum circuit breaker according to a first embodiment of the present disclosure is installed below a main circuit 100 of a vacuum circuit breaker A to monitor a contact wear of the vacuum interrupter 130.

First, main components of vacuum circuit breaker A are briefly described. Hereinafter, only some components of the vacuum circuit breaker related to an embodiment of the present disclosure will be briefly described.

The vacuum circuit breaker A includes a main circuit 100 including a vacuum interrupter 130, a push rod assembly 200 and a main shaft 300 for transmitting power to a contact of the vacuum interrupter 130, and a mechanism assembly 400 that generates a driving force and is connected to the main shaft 300 to deliver the driving force thereto.

The main circuit 100 has a housing 110 and the vacuum interrupter 130 installed inside the housing 110. The vacuum interrupter 130 includes an insulating container 132 having a receiving space defined therein, a fixed electrode 134 fixedly received in a upper portion of the insulating container 132, and a fixed contact **134*a* disposed at an end of the fixed electrode 134, a movable electrode 136 installed in a lower portion of the insulating container 132 to be movable up and down, and a movable contact 136*a* disposed at an end of the movable electrode 136. A arc shield 132*a* that creates vacuum is housed inside the insulating container 132. The arc shield 132*a* wraps around the fixed electrode 134 and the fixed contact 134*a*, and the movable electrode 136 and the movable contact 136*a*. The movable contact 136*a* may be brought into in an inserted state in which the movable contact 136*a* comes into contact with the fixed contact 134*a* under movement of the movable electrode 136 or may be brought into a withdrawn state (blocked state) in which the movable contact 136*a* is spaced from the fixed contact 134*a*. The movable electrode 136 ascends or descends under movement of the push rod assembly 200**.

The push rod assembly 200 inserts or withdraws the movable electrode 136. The push rod assembly 200 includes a movable rod 210 connected to the movable electrode 136 and a push rod 230 connected to the main shaft 300, and a rod housing 250 having a top coupled to the movable rod 210 and a bottom coupled to the push rod 230, and an inserting spring 270 which is accommodated inside the rod housing 250 and is compressed or restored by the push rod 230. The main shaft 300 is connected to the bottom of the push rod 230.

The main shaft 300 is connected to the mechanism assembly 400 and transmits the power generated from the mechanism assembly 400 to the push rod assembly 200.

As shown in FIG. 2 and FIG. 3, the contact monitoring device B according to the first embodiment of the present disclosure includes a sensor assembly 500 installed on a bottom face of the main circuit 100, and a discriminative sticker 700 attached to an outer circumferential face of a rod housing 210.

The sensor assembly 500 includes a photosensor module 510 for detecting a position of the discriminative sticker 700, a sensor holder 530 for accommodating therein the photosensor module 510, and a sensor bracket 550 for coupling the sensor holder 530 to the bottom of the main circuit 100. Although not shown in the drawing, the sensor assembly 500 may further include a determination unit (not shown).

The photosensor module 510 includes a light-emitter 512 and light-receiver 514, and a circuit 516 that processes signals from the light-emitter 512 and the light-receiver 514. The light-emitter 512 and the light-receiver 514 are mounted side by side and on one face of the circuit 516. The photosensor module 510 is mounted such that the light-emitter 512 and the light-receiver 514 face toward the housing 110 of the push rod assembly 200. Meaning of the orientation in which the photosensor module 510 is mounted will be described later.

The light-emitter 512 of the photosensor module 510 may emit light. The light-receiver 514 thereof detects an amount of the light reflected from a surface of discriminative sticker 700.

A photocurrent proportional to an intensity of the light detected by the light-receiver 514 flows in the circuit 516. Thus, the larger the amount of reflected and returned light, the larger the amount of the current generated. The photosensor module 510 detects the amount of the light emitting from the light-emitter 512 and then reflected from the sticker. Thus, as an object is farther away from the photosensor module 510, an amount of light reflected from the object and then incident to the light-receiver 514 decreases. As the amount of the incident light decreases, the photocurrent becomes weaker. Thus, a distance between the object and the photosensor module 510 is identified.

Therefore, a direction in which the photosensor module 510 emits light and then the light is reflected from the sticker and is incident to the module 510 refers to a sensing direction thereof. The photosensor module 510 may detect a displacement in the same direction as the sensing direction.

The circuit 516 may process the photocurrent to generate a signal and may output the signal to an external component. An intensity of the output signal decreases or increases based on the sensed light amount. The light amount varies based on the displacement. Therefore, processing the signal output from the circuit 516 may allow the displacement to be calculated. The signal output from the circuit 516 may be transmitted to an external data processing device not shown in the drawing, or to a smart terminal of an administrator not shown in the drawing or the like.

The above-described determination unit may be disposed in the circuit 516 or may be disposed in the external data processing device or the smart terminal. The determination unit may process the output signal from the circuit 516 and compare the processing result with a pre-stored reference value and thus determine the contact wear amount of the vacuum interrupter 130 based on the comparing result.

The sensor holder 530 houses the photosensor module 510. The sensor holder 530 may have a box shape with one open side face. The light-emitter 512 and the light-receiver 514 of the photosensor module 510 are exposed through one open side face of the sensor holder 530. The sensor holder 530 may have coupling means 532 in a side face opposite to the open one side face. The coupling means may be coupled to the sensor bracket 550. The coupling means 532 may be embodied as a hole into which a bolt is inserted.

The sensor holder 530 may have a frame shape such as a 'L', inversed 'L', or '⊏' shape rather than the box shape as long as the photosensor module 510 is inserted into but is not separated from the holder.

The sensor bracket 550 is mounted on a bottom of the housing 110 defining an exterior appearance of the main circuit 100. The sensor bracket 550 is not limited in a shape thereof as long as the sensor bracket may support the sensor holder 530. However, in accordance with the present disclosure, the photosensor module 510 should face toward the rod housing 210. Accordingly, the sensor bracket 550 has an inverted 'L' shape. The sensor holder 530 is coupled to a bottom face of the housing 110 of the main circuit 100. A plurality of fastening holes for fastening the sensor holder 530 to the sensor bracket 550 and a plurality of fastening holes for fastening the sensor bracket 550 to the housing 110 may be defined in a plate plane of the sensor bracket 550. The sensor bracket 550 may be coupled to the sensor holder 530 and the housing 110 via bolting or the like.

In the above-described embodiment, a case in which the sensor holder 530 and the sensor bracket 550 are separate components is described by way of example. However, when the sensor holder 530 and the sensor bracket 550 accommodate therein the photosensor module 510 and are coupled to the housing 110 of the main circuit 100, the sensor holder 530 and the sensor bracket 550 may be integrated into a single component. The photosensor module 510 mounted in the above manner may measure a displacement in a direction different from the sensing direction using the discriminative sticker 700.

As shown in FIG. 4, the discriminative sticker 700 refers to a sticker attached to the outer circumferential face of the rod housing 210. The discriminative sticker 700 has a rectangular shape with a predefined size. The discriminative sticker 700 is attached thereto such that the discriminative sticker 700 faces toward the photosensor module 510. A partial area as one end of the discriminative sticker 700 is white, a partial area as the other end thereof is black, and an area between the white area and the black area is a gray area in which a gray level is gradually increased or decreased. That is, the discriminative sticker 700 may have a plurality of areas in which the color or gray level changes from white to gray to black, or from black to gray to white in a stepwise manner. The areas with different colors or contrasts of the discriminative sticker 700 have different reflectance.

The white and black areas of the discriminative sticker 700 may be arranged in a vertical direction based on FIG. 2. Each of the white and black areas of the discriminative sticker 700 acts as an area bordering a surrounding area to prevent a color of the surrounding area from affecting the sensing result. Actual sensing may be performed on an area except for the white and black areas of the discriminative sticker 700.

The discriminative sticker 700 may be composed of a black top area, a white bottom area, and a plurality of areas in which the gray level gradually increases from the black to the white, as shown in FIG. 4.

The discriminative sticker 700 is used to discriminate the contact wear amount corresponding to a displacement perpendicular to the sensing direction of the photosensor module 510.

That is, the discriminative sticker 700 acts as a sticker for discriminating whether a vertical level to which the push rod assembly 200 moves upwardly changes because the fixed contact 134*a* and/or the movable contact 136*a* are worn by an amount equal to or greater than a certain amount. In this connection, the contact wear amount may be defined as a vertical displacement by which the push rod assembly ascends because the fixed contact or the movable contact is worn due to the repeated inserted states.

Therefore, the discriminative sticker 700 is positioned so that a sensed position by the photosensor module 510 (a position from which light from the light-emitter is reflected) corresponds to a second lower area from the black area of the discriminative sticker 700 in a state (open state) when the movable contact is not inserted. This position is defined as an open position 710. In the open state, positions at which light emission and light reception occur are always the same.

Further, an initial sensed position by the photosensor module 510 in a state in which the movable contact is inserted is referred to as an initial closed position 720. Thereafter, whenever the movable contact is inserted, and thus as the contact is worn, a vertical level to which the push rod assembly 200 moves upwardly gradually is displaced upwards. Thus, a vertical level of the discriminative sticker 700 is gradually displaced upwards. In this connection, the positions of the light-emitter 512 and the light-receiver 514 of the photosensor module 510 are fixed. Thus, a vertical level of a position of the discriminative sticker 700 toward and from which light emits and is reflected is gradually lowered. Accordingly, the sensed position of the discriminative sticker 700 by the photosensor module 510 is displaced toward a bottom of the discriminative sticker 700.

The discriminative sticker 700 may be attached so that when the push rod assembly 200 moves upwardly to a vertical level beyond a vertical level corresponding to a preset contact wear amount, an area immediately above the white area of the discriminative sticker 700 becomes the sensed position thereof by the photosensor module 510. The sensed position thereof at which the contact wear amount becomes a preset maximum value is defined as a maximum closed position 730.

Actual positions in the discriminative sticker 700 corresponding to the sensed position thereof by the photosensor module 510, and corresponding to a maximum contact wear amount may be pre-determined before the contact monitoring device is installed in a field.

A method for detecting the contact wear amount using the photosensor module in the contact monitoring device according to the first embodiment of the present disclosure having the above-described configuration will be described in detail as follows.

Since the push rod assembly 200 moves in the vertical direction in FIG. 2, the push rod assembly 200 is always maintained at the same position in the open state (See the open position 710 in FIG. 4). In the initial inserted state, the push rod assembly 200 has a certain amount of a vertical displacement (refer to the initial inserted position 720 in FIG. 4). However, when the contact is worn, the push rod assembly 200 ascends in the vertical direction by a displacement corresponding to the wear amount. That is, an increase in the vertical displacement of the push rod assembly 200 corresponds to the contact wear amount.

In order to measure the displacement amount of the push rod assembly 200, the vertical displacement of the push rod assembly 200 must be detected. To this end, it is preferable to install a sensor capable of detecting the vertical displacement below the push rod assembly 200. However, since the main shaft 300 is coupled to a lower end of the push rod assembly 200 and lower components of the vacuum circuit breaker A exist below the push rod assembly 200, it is difficult to secure an sufficient space to install the sensor below the push rod assembly 200.

Therefore, the photosensor module 510 according to the present disclosure is installed adjacent to the outer circumferential face of the rod housing 210 and installed at one side parallel to the vertical movement direction of the push rod assembly 200. In this connection, the sensing direction of the photosensor module 510 is perpendicular to the vertical movement direction of the push rod assembly 200. Further, in order to minimize an interference with surrounding portions, the photosensor module 510 is installed on the bottom of the housing 110 of the main circuit 100 and adjacent to the outer circumferential face of the rod housing 210.

The push rod assembly 200 only has the displacement in the vertical direction and does not move in a horizontal direction. Thus, even when the photosensor module 510 is installed on one side face of the push rod assembly 200, the vertical displacement of the push rod assembly 200 is detected by the photosensor module 510. To solve this problem, in this embodiment, the discriminative sticker 700 is applied to generate the same effect as converting the vertical displacement of the push rod assembly 200 into the horizontal displacement thereof. The photosensor module 510 may be used together with the discriminative sticker 700.

As shown in FIG. 2 and FIG. 4, the discriminative sticker 700 is attached on the outer circumferential face of the rod housing 210 facing toward the photosensor module 510. In this connection, before the rod housing 210 are inserted, a vertical level of the position of the light-emitter 512 and the light-receiver 514 of the photosensor module 510 is the same as a vertical level of the open position 710 of the discriminative sticker 700. The open position 710 becomes the sensed position of the discriminative sticker 700 by the photosensor module 510 before the rod housing 210 are inserted. Even when the contact wear amount gradually increases as the movable contact is repeatedly inserted, the sensed position by the photosensor module 510 is higher than the maximum closed position 730 when the contact wear amount is below a preset limit.

As the movable contact is repeatedly inserted and thus the contact wear amount increases, as shown in FIG. 5, a vertical level of the rod housing 210 gradually move upwardly. As the rod housing 210 ascends, the discriminative sticker 700 also ascends. Since the positions of the light-emitter 512 and the light-receiver 514 of the photosensor module 510 are fixed, a vertical level of a position in the discriminative sticker 700 toward and from which the light emits and is received gradually descend as the discriminative sticker 700 ascends.

As the contact wear amount gradually increases, the rod housing 210 may gradually ascend. When the contact wear amount reaches the preset limit, the sensed position by the photosensor module 510 becomes the maximum closed position 730.

In this embodiment, the light emitting towards and reflected from the open position 710 of the discriminative sticker 700 has a light amount much smaller than that of light reflected from the maximum closed position 730. This is because the black is a color that absorbs light. Therefore, a magnitude of the photocurrent generated when the sensed position of the discriminative sticker 700 by the photosensor module 510 is the maximum closed position 730 increases rapidly compared to that when the sensed position of the discriminative sticker 700 is the open position 710 of the discriminative sticker 700. Therefore, the output signal output from the photosensor module 510 varies based on the sensed positions of the discriminative sticker 700. The determination unit may analyze the output signal to identify the vertical displacement of the rod housing 210. Since the vertical displacement of the rod housing 210 corresponds to the contact wear amount, the determination unit may identify whether the contact wear amount has reached the preset limit based on the analyzing result of the signal output from the photosensor module 510.

As in the above embodiment, the top area of the discriminative sticker 700 is black and the bottom area thereof is white. The discriminative sticker 700 includes the plurality of areas in which the gray level gradually increases from black to white. In this connection, the determination unit may compare the contact wear amount based on the output signal output from the circuit with a reference value and determine whether the contact wear amount is greater than or equal to the pre-stored threshold value, and if so, determine that the contact wear amount has reached the limit value, and may output a notification signal to the user.

Alternatively, the top area of the discriminative sticker 700 is white and the bottom area thereof is black. The discriminative sticker 700 includes the plurality of areas in which the gray level gradually decreases from white to black. In this case, as a vertical level of the sensed area by the photosensor module 510 is gradually lower, an amount of light reflected therefrom gradually decreases. In this connection, the determination unit may compare the contact wear amount based on the output signal output from the circuit with a reference value and determine whether the contact wear amount is smaller than or equal to the pre-stored threshold value, and if so, determine that the contact wear amount has reached the limit value, and may output a notification signal to the user.

The photosensor module 510 does not directly detect the vertical displacement perpendicular to the sensing direction. However, the change in the reflectance based on the change in the gray level of the discriminative sticker 700 achieves the effect of converting the vertical displacement into the horizontal displacement. Therefore, the contact monitoring device may indirectly monitor and detect the contact wear amount using the photosensor module 510.

The contact wear amount monitored by the photosensor module 510 may be monitored in real time or at a preset time period. Accordingly, the contact monitoring device may determine a timing before the contact wear amount increases beyond the limit value. Thus, the contact monitoring device may allow the user to know an appropriate maintenance timing. Further, the contact monitoring device may improve the reliability and performance of the vacuum circuit breaker.

In the above description, a case in which the discriminative sticker has discontinuous gray level areas is described by way of example. However, the discriminative sticker may have other embodiments.

Figure 6:
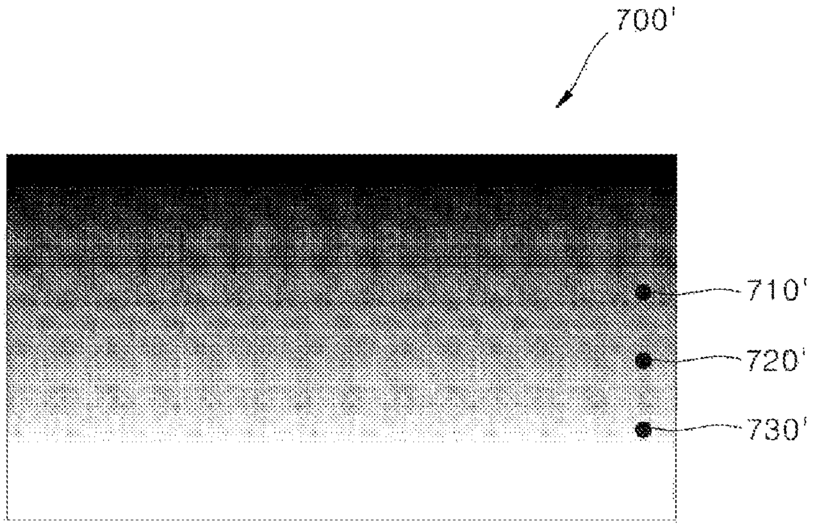
FIG. 6 is a schematic diagram showing a discriminative sticker of a contact sensing device according to a second embodiment of the present disclosure.

FIG. 6 is a schematic diagram showing a discriminative sticker of another contact sensing device in a second embodiment of the present disclosure.

A discriminative sticker 700' of the contact sensing device according to the second embodiment of the present disclosure may have continuous gray levels. When the discriminative sticker 700' has the continuous gray levels, the reflectance gradually changes, and thus a current value corresponding to the reflected light also changes gradually.

A gradation step of the discriminative sticker 700' may be set in consideration of the ascending displacement of the rod housing 210 based on the contact wear amount per step where a withdrawn state (open position) 710', an initial inserted state 720', and a maximum closed position 720' corresponding to the maximum contact wear amount are preset.

In the above-described embodiment, a case in which the photosensor module is installed at a position parallel to the rod housing of the push rod assembly is described by way of example. However, the photosensor module may be installed below the push rod assembly when interference of the photosensor module with the surrounding portions may be avoided. In this case, since the sensing direction of the photosensor module and the movement direction of the push rod assembly are the same as each other, the contact wear amount as the vertical displacement may be directly detected using the photosensor without the discriminative sticker.

In one example, the discriminative sticker may include just two areas with different reflectance.

Figure 7:
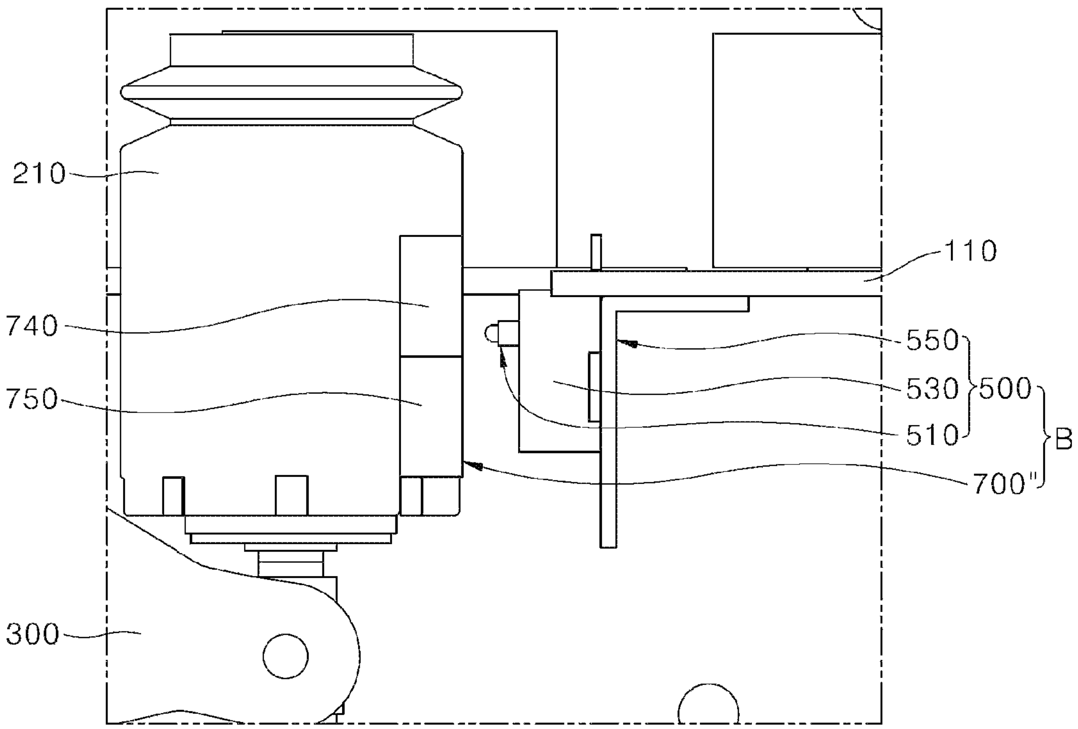
FIG. 7 is a perspective view showing a mounted state of a contact monitoring device according to a third embodiment of the present disclosure.
Figure 8:
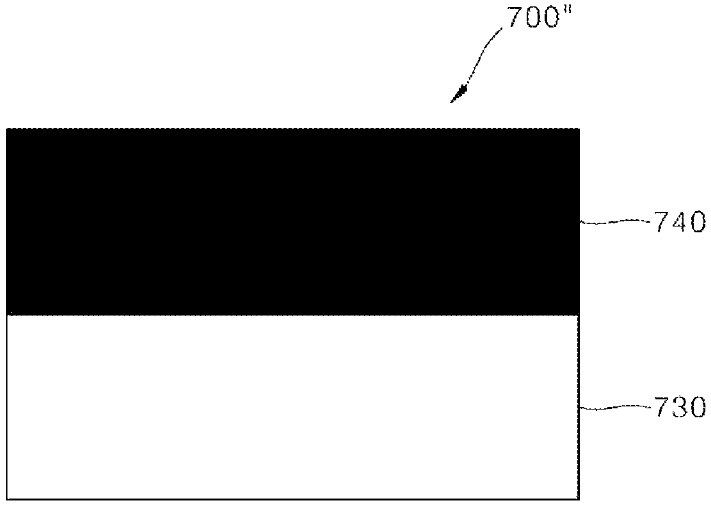
FIG. 8 is a schematic diagram showing a discriminative sticker of the contact monitoring device according to FIG. 7.
Figure 9:
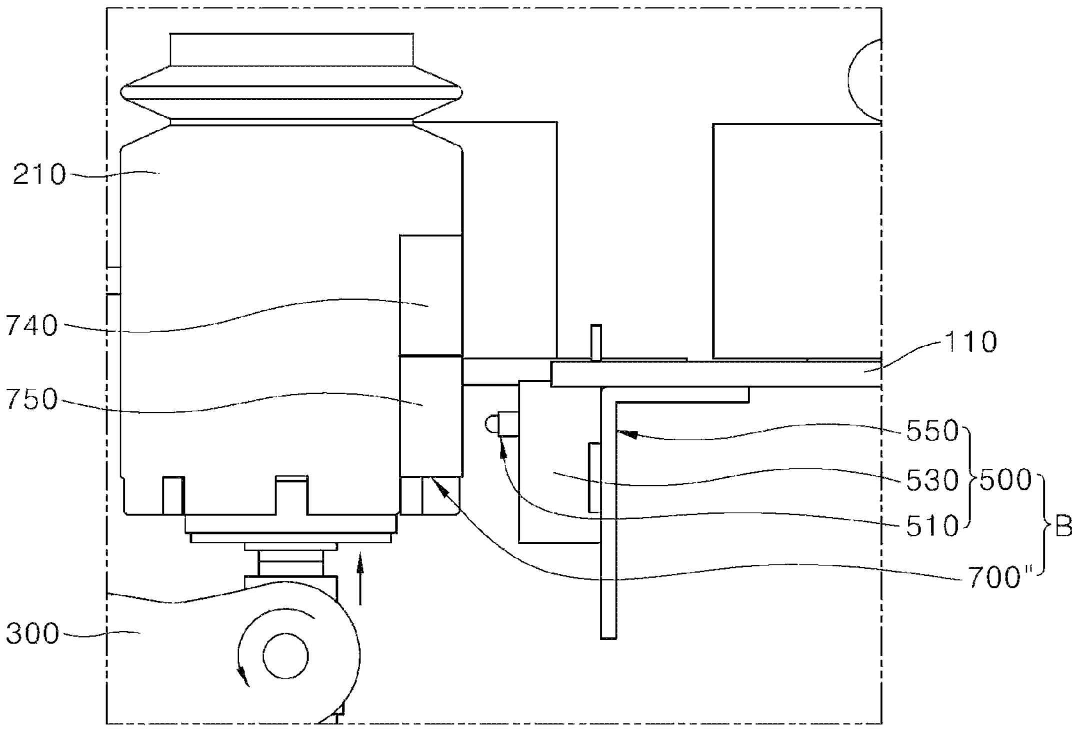
FIG. 9 is a perspective view showing a motion state of the contact monitoring device according to FIG. 7.

FIG. 7 is a perspective view showing a mounted state of a contact monitoring device according to a third embodiment of the present disclosure. FIG. 8 is a schematic diagram showing a discriminative sticker of the contact monitoring device according to FIG. 7. FIG. 9 is a perspective view showing a motion state of the contact monitoring device according to FIG. 7.

As shown in FIG. 7 and FIG. 8, the third embodiment of the present disclosure is the same as the first embodiment except that the discriminative sticker 700" includes two areas. Thus, the redundant description is omitted below.

As shown in FIG. 7 and FIG. 8, according to the third embodiment of the present disclosure, the discriminative sticker 700" is attached to the outer circumferential face of the rod housing 210. The discriminative sticker 700" has a rectangular shape with a predefined size. The discriminative sticker 700" faces toward the photosensor module 510.

The discriminative sticker 700" has a first partial area which is white and a second partial area which is black. For example, in the discriminative sticker 700", the upper area may be black, and the lower area may be white. Alternatively, the upper area may be white and the lower area may be black. Since the black is a color that absorbs light and white is a color that reflects light, the reflectance of the two areas are different from each other. That is, the reflectance of the upper area of the discriminative sticker 700" is different from the reflectance of the lower area thereof. Thus, the photosensor module 510 may identify the difference and distinguish the two areas from each other. Hereinafter, the upper area of the discriminative sticker 700" is defined as a first area 740, and the lower area thereof is defined as a second area 750.

The white and black areas of the discriminative sticker 700" may be arranged in the vertical direction based on FIG. 7. The discriminative sticker 700" may be composed of the first area 740 which is black and the second area 750 which is white, as shown in FIG. 8, or conversely, may be composed of the first area 740 which is white and the second area 750 which is black.

The discriminative sticker 700" is used to discriminate the contact wear amount corresponding to the displacement perpendicular to the sensing direction of the photosensor module 510.

That is, the discriminative sticker 700" acts as a sticker for discriminating whether a vertical level to which the push rod assembly 200 moves upwardly changes because the fixed contact **134*a* and/or the movable contact 136*a*** are worn by an amount equal to or greater than a certain amount.

Accordingly, the sensed position by the photosensor module 510 in the state (open state) in which the contact is not inserted may correspond to a portion of the first area 740 of the discriminative sticker 700". Although not shown in the drawing, in the open state, positions at which light emission and light reception occur are always the same.

Thereafter, whenever the movable contact is inserted, and thus as the contact is worn, a vertical level to which the push rod assembly 200 moves upwardly gradually is displaced upwards. Thus, a vertical level of the discriminative sticker 700" is gradually displaced upwards. Accordingly, the sensed position of the discriminative sticker 700" by the photosensor module 510 is displaced toward a bottom of the discriminative sticker 700". However, when the contact wear amount is smaller than or equal to the preset threshold value, the sensed position by the photosensor module 510 continues to be positioned within the first area 740 of the discriminative sticker 700". However, the sensed position by the photosensor module 510 is located in a portion of the first area 740 lower than that in the open state.

When the number of the insertions of the movable contact increases and thus the push rod assembly 200 displaces upwardly by a distance larger than a distance corresponding to the preset contact wear amount, the sensed position of the discriminative sticker 700" by the photosensor module 510 move into the second area 750. That is, the position of the discriminative sticker 700" may be set such that when the contact wear amount exceeds the pre-stored threshold value, the reflectance has changed and thus the amount of light sensed by the photosensor module 510 has changed. Therefore, the output signal of the photosensor module 510 has changed. Thus, the device may identify whether the contact wear amount exceeds the threshold value.

The threshold value of the contact wear amount may be preset based on a wear amount at which a contact pressure is lowered, thereby causing a problem in the reliability of the breaker.

A method for detecting the contact wear amount using the photosensor module in the contact monitoring device according to the third embodiment of the present disclosure having the above-described configuration will be described in detail as follows.

Since the push rod assembly 200 moves in the vertical direction in FIG. 7, the push rod assembly 200 is always maintained at the same position in the open state (See the open position 710 in FIG. 4). In the initial inserted state, the push rod assembly 200 has a certain amount of a vertical displacement in the first area 740 in FIG. 8. However, when the contact is worn, the push rod assembly 200 ascends in the vertical direction by a displacement corresponding to the wear amount. That is, an increase in the vertical displacement of the push rod assembly 200 corresponds to the contact wear amount.

In order to measure the displacement amount of the push rod assembly 200, the vertical displacement of the push rod assembly 200 must be detected. To this end, it is preferable to install a sensor capable of detecting the vertical displacement below the push rod assembly 200. However, since the main shaft 300 is coupled to a lower end of the push rod assembly 200 and lower components of the vacuum circuit breaker A exist below the push rod assembly 200, it is difficult to secure an sufficient space to install the sensor below the push rod assembly 200.

Therefore, the photosensor module 510 according to the present disclosure is installed adjacent to the outer circumferential face of the rod housing 210 and installed at one side parallel to the vertical movement direction of the push rod assembly 200. In this connection, the sensing direction of the photosensor module 510 is perpendicular to the vertical movement direction of the push rod assembly 200. Further, in order to minimize an interference with surrounding portions, the photosensor module 510 is installed on the bottom of the housing 110 of the main circuit 100 and adjacent to the outer circumferential face of the rod housing 210.

The push rod assembly 200 only has the displacement in the vertical direction and does not move in a horizontal direction. Thus, even when the photosensor module 510 is installed on one side face of the push rod assembly 200, the vertical displacement of the push rod assembly 200 is detected by the photosensor module 510. To solve this problem, in this embodiment, the discriminative sticker 700" is applied to generate the same effect as converting the vertical displacement of the push rod assembly 200 into the horizontal displacement thereof. The photosensor module 510 may be used together with the discriminative sticker 700".

As shown in FIG. 7, the discriminative sticker 700" is attached on the outer circumferential face of the rod housing 210 facing toward the photosensor module 510. In this connection, before the rod housing 210 are inserted, a vertical level of the position of the light-emitter and the light-receiver of the photosensor module 510 is the same as a vertical level of the first area 740 of the discriminative sticker 700". Even when the contact wear amount gradually increases as the movable contact is repeatedly inserted, the sensed position by the photosensor module 510 is positioned in the first area 740 of the discriminative sticker 700" when the contact wear amount is below a preset limit. However, the sensed position by the photosensor module 510 when the contact wear occurs is located in a portion of the first area 740 lower than that in the open state.

As the movable contact is repeatedly inserted and thus the contact wear amount increases, as shown in FIG. 9, a vertical level of the rod housing 210 gradually move upwardly. As the rod housing 210 ascends, the discriminative sticker 700" also ascends. Since the positions of the light-emitter 512 and the light-receiver 514 of the photosensor module 510 are fixed, a vertical level of a position in the discriminative sticker 700" toward and from which the light emits and is received gradually descend as the discriminative sticker 700" ascends.

The discriminative sticker 700" is configured so that the sensed position of the discriminative sticker 700" by the photosensor module 510 is located in the first area 740 for a duration from a state before the initial insertion to a state before the contact wear amount reaches the preset limit. This principle is equally applied to the attachment position of the discriminative sticker 700". Therefore, until the contact wear amount reaches the preset threshold value, the sensed position of the discriminative sticker 700" by the photosensor module 510 is positioned in the first area 740 even when the rod housing 210 gradually ascends.

As the contact wear amount gradually increases, the rod housing 210 may gradually ascend. When the contact wear amount reaches the preset limit, the sensed position by the photosensor module 510 changes from the first area 740 into the second area 750.

In the third embodiment, the light emitting towards and reflected from the first area 740 of the discriminative sticker 700" has a light amount much smaller than that of light reflected from the second area 750 thereof. This is because the black is a color that absorbs light. Therefore, a magnitude of the photocurrent generated when the sensed position of the discriminative sticker 700" by the photosensor module 510 is located in the second area 750 increases rapidly compared to that when the sensed position of the discriminative sticker 700" is located in the first area 740 of the discriminative sticker 700".

Therefore, the output signal output from the photosensor module 510 varies based on the sensed positions of the discriminative sticker 700". The determination unit may analyze the output signal to identify the vertical displacement of the rod housing 210. Since the vertical displacement of the rod housing 210 corresponds to the contact wear amount, the determination unit may identify whether the contact wear amount has reached the preset limit based on the analyzing result of the signal output from the photosensor module 510. The determination of the contact wear amount may be made by an operator or a manager, or a device receiving the output signal of the photosensor module 510, or the like.

The photosensor module 510 does not directly detect the vertical displacement perpendicular to the sensing direction. However, the change in the reflectance based on the change in the gray level of the discriminative sticker 700" achieves the effect of converting the vertical displacement into the horizontal displacement. Therefore, the contact monitoring device may indirectly monitor and detect the contact wear amount using the photosensor module 510.

The contact wear amount monitored by the photosensor module 510 may be monitored in real time or at a preset time period. Accordingly, the contact monitoring device may determine a timing before the contact wear amount increases beyond the limit value. Thus, the contact monitoring device may allow the user to know an appropriate maintenance timing. Further, the contact monitoring device may improve the reliability and performance of the vacuum circuit breaker.

In the above-described embodiment, a case in which the photosensor module is installed at a position parallel to the rod housing of the push rod assembly is described by way of example. However, the photosensor module may be installed below the push rod assembly when interference of the photosensor module with the surrounding portions may be avoided. In this case, since the sensing direction of the photosensor module and the movement direction of the push rod assembly are the same as each other, the contact wear amount as the vertical displacement may be directly detected using the photosensor without the discriminative sticker.

The present disclosure as described above may be subjected to various substitutions, modifications and changes within the scope that does not depart from the technical spirit of the present disclosure by those of ordinary skill in the technical field to which the present disclosure belongs. Thus, the present disclosure is not limited to the above-described embodiments and the attached drawings.

What is claimed is:

1. A contact monitoring device, comprising:
a vacuum circuit breaker, including:
a vacuum interrupter having a fixed electrode and a movable electrode;
a push rod assembly coupled to the movable electrode for raising up or lowering the movable electrode;
a discriminative sticker that has a plurality of areas arranged in a movement direction of the push rod assembly; and
a sensor assembly configured to monitor a position of the discriminative sticker and having a sensing direction different from the movement direction of the push rod assembly,
wherein the plurality of areas have reflectance varying in a stepwise manner.

2. The contact monitoring device of claim 1, wherein the sensing direction of the sensor assembly is perpendicular to the movement direction of the push rod assembly and coupled to the movable electrode,
wherein the vacuum interrupter includes:
an insulating container in which the fixed electrode is fixedly received and the movable electrode is installed, wherein the movable electrode is movable downwardly or upwardly;
a fixed contact disposed at one end of the fixed electrode; and
a movable contact disposed at one end of the movable electrode, wherein the movable contact contacts or is spaced from the fixed contact.

3. The contact monitoring device of claim 2, wherein the discriminative sticker is attached to an outer circumferential face of a cylindrical rod housing of the push rod assembly.

4. The contact monitoring device of claim 3, wherein the discriminative sticker has a first area and a second area arranged in the movement direction of the push rod assembly, wherein the first area and the second area have different reflectance.

5. The contact monitoring device of claim 1, wherein the sensor assembly includes a photosensor module for monitoring the position of the discriminative sticker,
wherein the photosensor module includes:
a light-emitter facing toward the discriminative sticker and emitting light toward the discriminative sticker;
a light-receiver facing toward the discriminative sticker and receiving light reflected from the discriminative sticker; and
a circuit coupled to the light-emitter and the light-receiver, wherein the circuit outputs an output signal based on an amount of light received by the light-receiver.

6. The contact monitoring device of claim 5, wherein the sensor assembly further includes:
a sensor holder installed adjacent to the push rod assembly, wherein the holder accommodates therein the photosensor module, wherein the holder has one open side face facing toward the push rod assembly, wherein the light-emitter and the light-receiver are exposed toward the push rod assembly through the open one side face; and
a sensor bracket coupled to one side of a bottom of a main circuit housing to support the sensor holder.

7. The contact monitoring device of claim 5, wherein the sensor assembly further includes a determination unit configured to compare the output signal of the circuit with a pre-stored reference value and to determine a contact wear amount of the vacuum interrupter based on a result of comparing the output signal and the pre-stored reference value.

8. The contact monitoring device of claim 7, wherein the discriminative sticker has a black top area, a white bottom area, and a middle area therebetween, wherein a gray level in the middle area gradually increases from the top area to the bottom area,
wherein the determination unit is configured to determine that the contact wear amount reaches a limit value when the contact wear amount based on the output signal output from the circuit is greater than or equal to a pre-stored threshold value, and to output a notification signal.

9. The contact monitoring device of claim 7, wherein the discriminative sticker has a white top area, a black bottom area, and a middle area therebetween, wherein a gray level in the middle area gradually decreases from the top area to the bottom area,
wherein the determination unit is configured to determine that the contact wear amount reaches a limit value when the contact wear amount based on the output signal output from the circuit is smaller than or equal to a pre-stored threshold value, and to output a notification signal.

10. A contact monitoring device of comprising:
a vacuum circuit breaker, including:
a vacuum interrupter having a fixed electrode and a movable electrode;
a push rod assembly coupled to the movable electrode for raising up or lowering the movable electrode;
a discriminative sticker that has a gray level continuously gradually varying in a movement direction of the push rod assembly; and
a sensor assembly configured to monitor a position of the discriminative sticker and having a sensing direction different from the movement direction of the push rod assembly,
wherein the discriminative sticker has reflectance that continuously gradually varies in the movement direction of the push rod assembly.

11. The contact monitoring device of claim 10, wherein the sensor assembly includes a photosensor module for monitoring the position of the discriminative sticker,
wherein the photosensor module includes:
a light-emitter facing toward the discriminative sticker and emitting light toward the discriminative sticker;
a light-receiver facing toward the discriminative sticker and receiving light reflected from the discriminative sticker; and
a circuit coupled to the light-emitter and the light-receiver, wherein the circuit outputs an output signal based on an amount of light received by the light-receiver.

12. The contact monitoring device of claim 11, wherein the sensor assembly further includes:
a sensor holder installed adjacent to the push rod assembly, wherein the holder accommodates therein the photosensor module, wherein the holder has one open side face facing toward the push rod assembly, wherein the light-emitter and the light-receiver are exposed toward the push rod assembly through the open one side face; and a sensor bracket coupled to one side of a bottom of a main circuit housing to support the sensor holder.

13. The contact monitoring device of claim 11, wherein the sensor assembly further includes a determination unit configured to compare the output signal of the circuit with a pre-stored reference value and to determine a contact wear amount of the vacuum interrupter based on a result of comparing the output signal and the pre-stored reference value.

14. The contact monitoring device of claim 13, wherein the discriminative sticker has a black top area, a white bottom area, and a middle area therebetween, wherein a gray level in the middle area gradually increases from the top area to the bottom area, wherein the determination unit is configured to determine that the contact wear amount reaches a limit value when the contact wear amount based on the output signal output from the circuit is greater than or equal to a pre-stored threshold value, and to output a notification signal.

15. The contact monitoring device of claim 13, wherein the discriminative sticker has a white top area, a black bottom area, and a middle area therebetween, wherein a gray level in the middle area gradually decreases from the top area to the bottom area, wherein the determination unit is configured to determine that the contact wear amount reaches a limit value when the contact wear amount based on the output signal output from the circuit is smaller than or equal to a pre-stored threshold value, and to output a notification signal.

16. A vacuum circuit breaker comprising:

a vacuum interrupter having a fixed electrode and a movable electrode;

a main circuit having a housing accommodating therein the vacuum interrupter;

a push rod assembly coupled to the movable electrode for raising up or lowering the movable electrode;

a discriminative sticker arranged in a movement direction of the push rod assembly; and a sensor assembly that monitors a position of the discriminative sticker and having a sensing direction different from the movement direction of the push rod assembly, wherein the discriminative sticker has a plurality of areas arranged in the movement direction of the push rod assembly, wherein the plurality of areas have reflectance varying in a stepwise manner.

17. The vacuum circuit breaker of claim 16, wherein the sensing direction of the sensor assembly is perpendicular to the movement direction of the push rod assembly.

18. The vacuum circuit breaker of claim 17, wherein the vacuum circuit breaker further includes a discriminative sticker attached to an outer circumferential face of a cylindrical rod housing of the push rod assembly.

19. The vacuum circuit breaker of claim 18, wherein the discriminative sticker has a first area and a second area arranged in the movement direction of the push rod assembly, wherein the first area and the second area have different reflectance.

20. The vacuum circuit breaker of claim 16, wherein the sensor assembly includes a photosensor module for monitoring the position of the discriminative sticker, wherein the photosensor module includes:

a light-emitter facing toward the discriminative sticker and emitting light toward the discriminative sticker;

a light-receiver facing toward the discriminative sticker and receiving light reflected from the discriminative sticker; and a circuit coupled to the light-emitter and the light-receiver, wherein the circuit outputs an output signal based on an amount of light received by the light-receiver.

21. A vacuum circuit breaker comprising:

a vacuum interrupter having a fixed electrode and a movable electrode;

a main circuit having a housing accommodating therein the vacuum interrupter;

a push rod assembly coupled to the movable electrode for raising up or lowering the movable electrode;

a discriminative sticker arranged in a movement direction of the push rod assembly; and a sensor assembly that monitors a position of the discriminative sticker and having a sensing direction different from the movement direction of the push rod assembly, wherein the discriminative sticker has a gray level continuously gradually varying in the movement direction of the push rod assembly, and thus has reflectance continuously gradually varying in the movement direction of the push rod assembly.

22. The vacuum circuit breaker of claim 21, wherein the sensor assembly includes a photosensor module for monitoring the position of the discriminative sticker, wherein the photosensor module includes:

a light-emitter facing toward the discriminative sticker and emitting light toward the discriminative sticker;

a light-receiver facing toward the discriminative sticker and receiving light reflected from the discriminative sticker; and a circuit coupled to the light-emitter and the light-receiver, wherein the circuit outputs an output signal based on an amount of light received by the light-receiver.

* * * * *